US010107928B2

(12) United States Patent
Lee et al.

(10) Patent No.: US 10,107,928 B2
(45) Date of Patent: Oct. 23, 2018

(54) METHOD AND DEVICE FOR REMOVAL OF WATER BOTTOM AND/OR GEOLOGY FROM NEAR-FIELD HYDROPHONE DATA

(71) Applicant: CGG SERVICES SA, Massy (FR)

(72) Inventors: Yoong Ern Lee, Crawley (GB); Chris Davison, Crawley (GB); Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 97 days.

(21) Appl. No.: 15/216,179

(22) Filed: Jul. 21, 2016

(65) Prior Publication Data

US 2017/0023690 A1    Jan. 26, 2017

Related U.S. Application Data

(60) Provisional application No. 62/196,392, filed on Jul. 24, 2015.

(51) Int. Cl.
*G01V 1/36* (2006.01)
*G01V 1/28* (2006.01)
*G01V 1/38* (2006.01)

(52) U.S. Cl.
CPC .............. *G01V 1/364* (2013.01); *G01V 1/282* (2013.01); *G01V 1/36* (2013.01); *G01V 1/362* (2013.01); *G01V 1/38* (2013.01); *G01V 2210/1293* (2013.01); *G01V 2210/1423* (2013.01); *G01V 2210/56* (2013.01)

(58) Field of Classification Search
CPC ........ G01V 1/282; G01V 1/362; G01V 1/364; G01V 1/38; G01V 1/36; G01V 2210/56; G01V 2210/1293; G01V 2210/1423

USPC .......................................................... 367/24
See application file for complete search history.

(56) References Cited

U.S. PATENT DOCUMENTS

| 4,476,553 | A | 10/1984 | Ziolkowski et al. |
| 7,440,357 | B2 | 10/2008 | Hopperstad |
| 8,837,255 | B2 | 9/2014 | Ross et al. |
| 8,964,502 | B2 | 2/2015 | Norris |
| 2011/0063947 | A1 | 3/2011 | Norris |

FOREIGN PATENT DOCUMENTS

| EP | 2696217 A2 | 2/2014 |
| WO | 2014/177522 A2 | 11/2014 |
| WO | 2016/083892 A2 | 6/2016 |

OTHER PUBLICATIONS

J.F. Hopperstad et al., "Source Signature Estimation—Attenuation of the Seafloor Reflection Error in Shallow Water", EAGE 68th Conference & Exhibition, Vienna, Austria, Jun. 12-15, 2005.

(Continued)

*Primary Examiner* — Daniel L Murphy
(74) *Attorney, Agent, or Firm* — Patent Portfolio Builders PLLC

(57) ABSTRACT

A method for removing ocean bottom and/or geology related contamination. The method includes receiving first measurements corresponding to first seismic sensors mounted on a first source array; receiving second measurements corresponding to second seismic sensors mounted away from the first source array; processing the second measurements to determine a contamination model related to the ocean bottom and geology; removing the contamination model from the first measurements to obtain cleaned data; and calculating a source signature of the first source array based on the cleaned data.

20 Claims, 9 Drawing Sheets

(56) References Cited

OTHER PUBLICATIONS

Y. Ni et al, "Source Signature Estimation in Shallow Water Surveys", SEG Annual Meeting, New Orleans, Louisiana, 2015, pp. 71-75.
M.W. Norris et al., "Zero-Offset Profile from Near-Field Hydrophone Data", 73rd EAGE Conference & Exhibition Incorporating SPE EUROPEC 2011, Vienna, Austria, May 23-26, 2011.
G.E. Parkes, et al., "The Signature of an Air Gun Array: Computation from Near-Field Measurements Including Interactions—Practical Considerations", Geophysics, Feb. 1984, vol. 48, No. 2, pp. 105-111.
A. Pica et al., "3D Surface-Related Multiple Modeling, Principles and Results", SEG Annual Meeting, Houston, Texas, 2005, pp. 2080-2084.
R. Siliqi et al., "Synchronized Multi-Level Source, a Robust Broadband Marine Solution", SEG Annual Meeting, Houston, Texas, 2013, pp. 56-60.
P. Wang et al., "Model-Based Water-Layer Demultiple", SEG Annual Meeting, San Antonio, Texas, 2011, pp. 3551-3555.
A. Ziolkowski et al., "The Signature of an Air Gun Array: Computation from Near-Field Measurements Including Interactions", Geophysics, Oct. 1982, vol. 47, No. 10, pp. 1413-1421.
Extended European Search Report in corresponding European Application No. EP 16 30 5942 dated Nov. 29, 2016.
E. Kragh, et al.; "Source signature estimation—attenuation of the sea-bottom reflection error from near-field measurements"; First Break, vol. 18, No. 6; XP055215595; Jun. 1, 2000; pp. 260-264.

METHOD AND DEVICE FOR REMOVAL OF WATER BOTTOM AND/OR GEOLOGY FROM NEAR-FIELD HYDROPHONE DATA

CROSS REFERENCE TO RELATED APPLICATIONS

This application claims priority and benefit from U.S. Provisional Patent Application No. 62/196,392, filed Jul. 24, 2015, the entire contents of which are incorporated herein by reference.

BACKGROUND

Technical Field

Embodiments of the subject matter disclosed herein generally relate to methods and systems for imaging and characterizing a subsurface and more specifically to a method for removing water bottom and/or geology contamination from near-field sensor recordings.

Discussion of the Background

Reflection seismology is one tool in the geophysical exploration arsenal for determining the properties (e.g., an image) of a subsurface layer in the earth, which information is especially helpful in the oil and gas industry. Marine reflection seismology is based on the use of a controlled source (e.g., air gun, vibratory element, etc.) that sends energy waves into the earth. By measuring the time it takes for the reflections to come back to plural receivers, it is possible to estimate the depth and/or composition of the features causing such reflections and thus, to generate an image of the subsurface. These features may be associated with subterranean hydrocarbon deposits and the generated image may indicate, to those skilled in the art, the location of these deposits. Thus, improving the functionality of any component (source or receiver or computer that generates the image) of the seismic acquisition system results in a better image of the subsurface, and consequently, a higher likelihood of finding the deposits.

For marine applications, commonly used seismic sources are essentially impulsive (e.g., air guns that hold compressed air that is suddenly allowed to expand). An air gun produces a high amount of acoustic energy over a short time. Such a source is towed by a vessel at a certain depth along a given direction (called inline direction). The acoustic waves from the air gun propagate in all directions. The air gun instantaneously releases large peak acoustic pressure and energy.

Such a source array is illustrated in FIG. 1. FIG. 1 shows a generic source array 104 (note that the full configuration of the source array is not shown for simplicity) being towed behind a vessel 101. When the source array is activated, acoustic energy is coupled into the water and transmitted into the earth, where part of the energy is partially reflected back from the ocean bottom 113 and from rock formation interfaces 112 (rock layer that has a change in acoustic impedance). Sensors or receivers 106 used to record the reflected energy include hydrophones, geophones and/or accelerometers. The receivers can be encapsulated in either fluid filled, gel filled or solid streamers 105 that are also towed by vessels at shallow depth.

Returning to the air guns, an air gun stores compressed air and releases it suddenly underwater when fired. The released air forms a bubble (which may be considered spherical), with air pressure inside the bubble initially greatly exceeding the hydrostatic pressure in the surrounding water. The bubble expands, displacing the water and causing a pressure disturbance that travels through the water. As the bubble expands, the pressure decreases, eventually becoming lower than the hydrostatic pressure. When the pressure becomes lower than the hydrostatic pressure, the bubble begins to contract until the pressure inside again becomes larger than the hydrostatic pressure. The process of expansion and contraction may continue through many cycles, thereby generating a pressure (i.e., seismic) wave. The pressure variation generated in the water by a single air gun (which can be measured using a hydrophone or geophone located near the air gun) as a function of time is called the near-field signature and is illustrated in FIG. 2.

A first pressure increase due to the released air is called primary pulse. The primary pulse is followed by a pressure drop known as a ghost arrival. The ghost arrival relates to a reflection of the source energy leaving the source upwards and being reflected downwards from the free surface. Between highest primary pressure and lowest ghost pressure there is a peak pressure variation (P-P). The pulses following the primary and the ghost are known as a bubble pulse train. The pressure difference between the second pair of high and low pressures is a bubble pressure variation $P_b$-$P_b$. The time T between pulses is the bubble period.

A source that includes a single air gun is not practical because it does not produce enough energy to penetrate at desired depths under the seafloor, and plural weak oscillations (i.e., the bubble pulse train) following the primary (first) pulse complicates seismic data processing. These problems are overcome by using arrays of air guns (i.e., the source array), which generate a larger amplitude primary pulse and canceling secondary individual pulses by destructive interference.

FIG. 2 represents a situation in which the bubble generated by a single air gun drifts slowly toward the surface, surrounded by water having the hydrostatic pressure constant or slowly varying as the bubble slowly drifts upward. However, when another air gun is fired simultaneously in proximity to the first air gun, the hydrostatic pressure is no longer constant or slowly varying. The bubbles of neighboring guns affect each other.

A source array includes plural individual source elements (e.g., air guns). An individual source element may be a single air gun or a cluster of air guns. Since the dimensions of the source array, including plural individual source elements, are comparable with the generated wave's wavelength, the overall wave generated by the source array is directional, i.e., the shape of the wave, or the source signature varies with the direction until, at a great enough distance, the wave starts having a stable shape. The air guns may all be positioned at the same depth, or may be positioned at a variety of depths. After the shape become stable, the amplitude of the wave decreases inversely proportional to the distance. The region where the signature shape no longer changes significantly with distance is known as the "far-field," (or where the wavelength of the wave is much smaller than a distance d from the gun to the observation point) in contrast to the "near-field" region (where the wavelength is larger than distance d) where the shape varies. Knowledge of the wave source's far-field signature is desirable in order to extract information about the geological structure generating the detected wave upon receiving the far-field input wave.

An accurate description of a seismic source signature is required in order to carry out a number of functions in seismic data processing. For example, source de-signature, deghosting, zero-phasing or de-bubbling, may be carried out using far-fields derived for a seismic source, which may be one-dimensional (1D), two-dimensional (2D) or three-dimensional (3D). The source signature may or may not include the free surface ghost.

In order to estimate the source array's far-field signature, an equivalent notional signature for each individual source may be calculated for each of the guns using near-field measurements (see e.g., U.S. Pat. No. 4,476,553 incorporated herewith by reference). The equivalent notional signature is a representation of an amplitude due to an individual wave source as a function of time, the source array's far-field signature being a superposition of the notional signatures corresponding to each of the individual sources. In other words, the equivalent notional signature is a tool for representing the contribution of an individual source to the far-field signature of the source array, such that the individual source contribution is decoupled from contributions of other individual wave sources in the source array. It should be understood that the notional sources may contain some energy arising from bubble interactions with other bubbles.

Ziolkowski et al., "The signature of an Air Gun Array: Computation from Near Field Measurements Including Interactions", Geophysics, Vol. 47, No. 10, pp. 1413-1421 (October 1982) and Parkes et al., "The Signature of an Air Gun Array: Computation from Near-Field Measurements Including Interactions—Practical Considerations, Geophysics, Vol. 48, No. 2, pp. 105-111 (February 1984), proposed the inversion of data obtained from near-field hydrophone (NFH) sensors mounted on the source array in the vicinity of the seismic air-guns, i.e., in the near-field, to obtain the source signature characteristics. Key to this methodology is the definition of notional sources as source signatures in the proximity of individual air guns within the seismic source array, but taking the interactions between the bubbles, which take place when the guns are fired together, into account. These notional sources are used to generate the source array signatures as desired.

An alternative approach where NFH data is not available is described in WO 2016/083892. In this approach, direct arrival data is used to derive a representation of the source emission.

However, if the water bottom reflection time is less than the required far-field signature length (i.e., the water is shallow), the NFH sensors mounted on the source array will record reflections from the water bottom and geology of the subsurface (because of their location and/or sensitivity, the NFH sensors record only shallow geology, i.e., geological features that are not very deep under the water bottom), in addition to the primary signals from the individual airguns and ghost reflections of the airguns from the sea surface. For example, if a 1 second far-field signature is required, then a water depth d corresponding to the 1 s far-field signature is d=vt/2=1500 m/s*1 s/2=750 m, where v is the velocity of sound in water and t is the desired far-field length. The water bottom and geology signals recorded by NFH sensors are smaller in magnitude compared to the primary and ghost signals, nevertheless, if not removed, this reflected data will result in corresponding contamination in the notional sources and far-fields inverted from the NFH data.

For those situations where such contamination is present in the NFH data, but the water bottom and geology are not flat, the contamination may be removed by stacking each NFH recording along the line to give an averaged set of NFH recordings, from which global notional sources and far-fields may be inverted for the line. An example of this approach is given in Ni, Y., Haouam, F., and Siliqi, R., 2015, "Source signature estimation in shallow water surveys," SEG conference proceedings. In many cases, if shot by shot notional sources and far-fields are required, this method is unsuitable.

An alternative is to extend the approach of Ziolkowski by modeling the water-bottom reflection as part of the NFH inversion as described in Hopperstad, J. F. and Laws, R., 2006, "Attenuation of the seafloor reflection error in shallow water," EAGE conference proceedings and U.S. Pat. No. 7,440,357. This approach requires accurate information about the timing and reflectivity of the water bottom.

Furthermore, in cases where the water bottom or geology are flat, even the stacked NFH recordings will still contain the reflections from the sea floor and geology, resulting in contaminated results for the global notional sources and far-fields.

Thus, there is a need to develop a method that can remove the contamination from the NFH recordings.

SUMMARY

According to an embodiment, there is a method for removing ocean bottom and/or geology related contamination. The method includes receiving first measurements corresponding to first seismic sensors mounted on a first source array; receiving second measurements corresponding to second seismic sensors mounted away from the first source array; processing the second measurements to determine a contamination model related to the ocean bottom and geology; removing the contamination model from the first measurements to obtain cleaned data; and calculating a source signature of the first source array based on the cleaned data.

According to another embodiment, there is a computing device for removing ocean bottom and/or geology related contamination from recorded seismic data. The computing device includes an interface for receiving first measurements corresponding to first seismic sensors mounted on a first source array and for receiving second measurements corresponding to second seismic sensors mounted away from the first source array; and a processor connected to the interface. The processor is configured to process the second measurements to determine a contamination model related to the ocean bottom and geology; remove the contamination model from the first measurements to obtain cleaned data; and calculate a source signature of the first source array based on the cleaned data.

According to still another exemplary embodiment, there is a non-transitory computer readable medium including computer executable instructions, wherein the instructions, when executed by a computer, implement a method for removing ocean bottom and/or geology related contamination as noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to hydrophone sensors located on two source arrays. However, the embodiments to be discussed next are not limited to this configuration, but may be extended to other arrangements that include different sensors and/or other locations of the sensors than on the source array.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a method removes the contamination from the NFH recordings. This method may be used to generate cleaned NFH recordings, which can be used to derive a representation of the source signal, or for any other application where NFH data uncontaminated by water bottom and/or geology are required. The representation of the source signal may be notional sources or far-field signatures in one or more directions.

Figure 1:
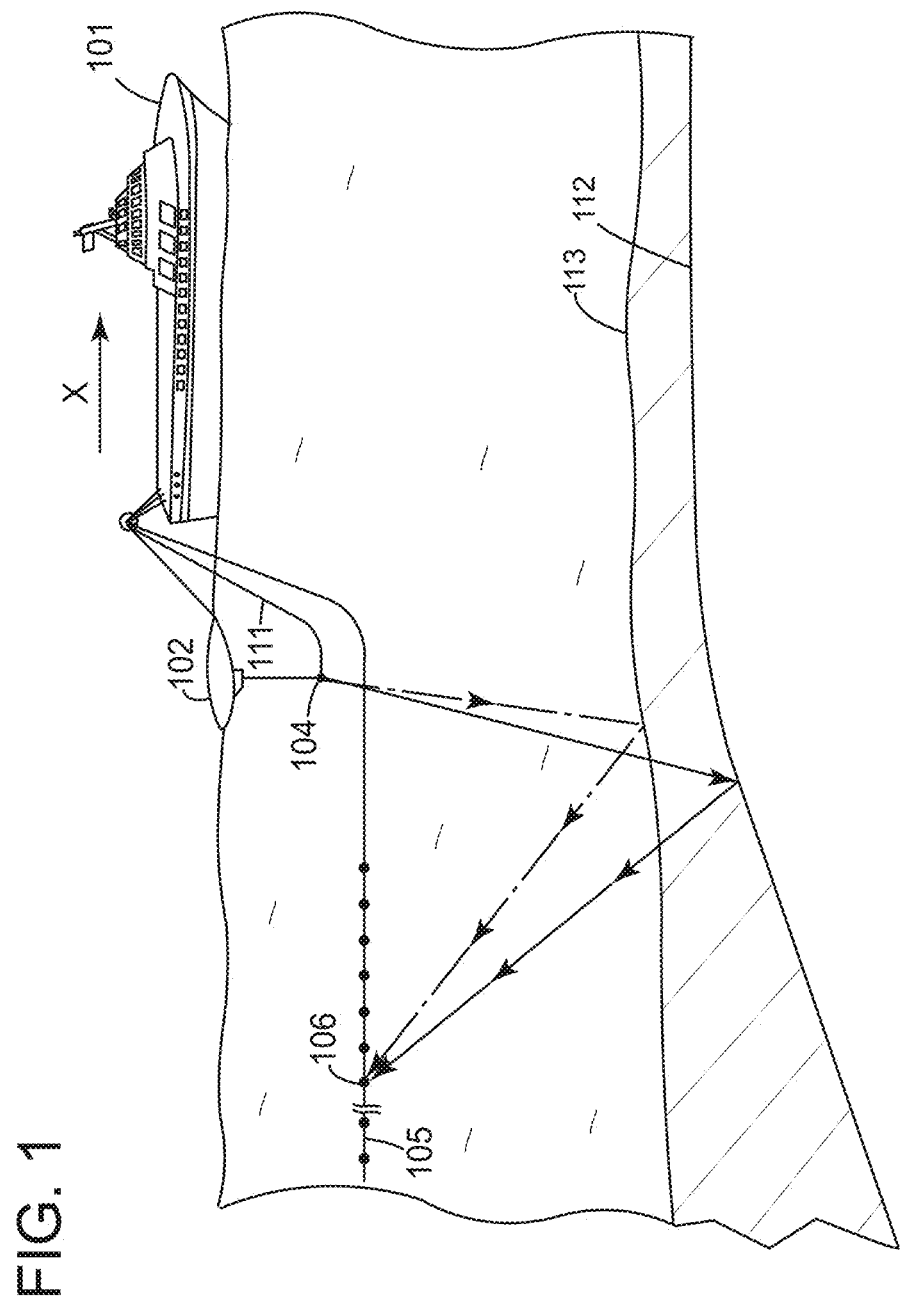
FIG. 1 illustrates a traditional marine seismic survey system.
Figure 2:
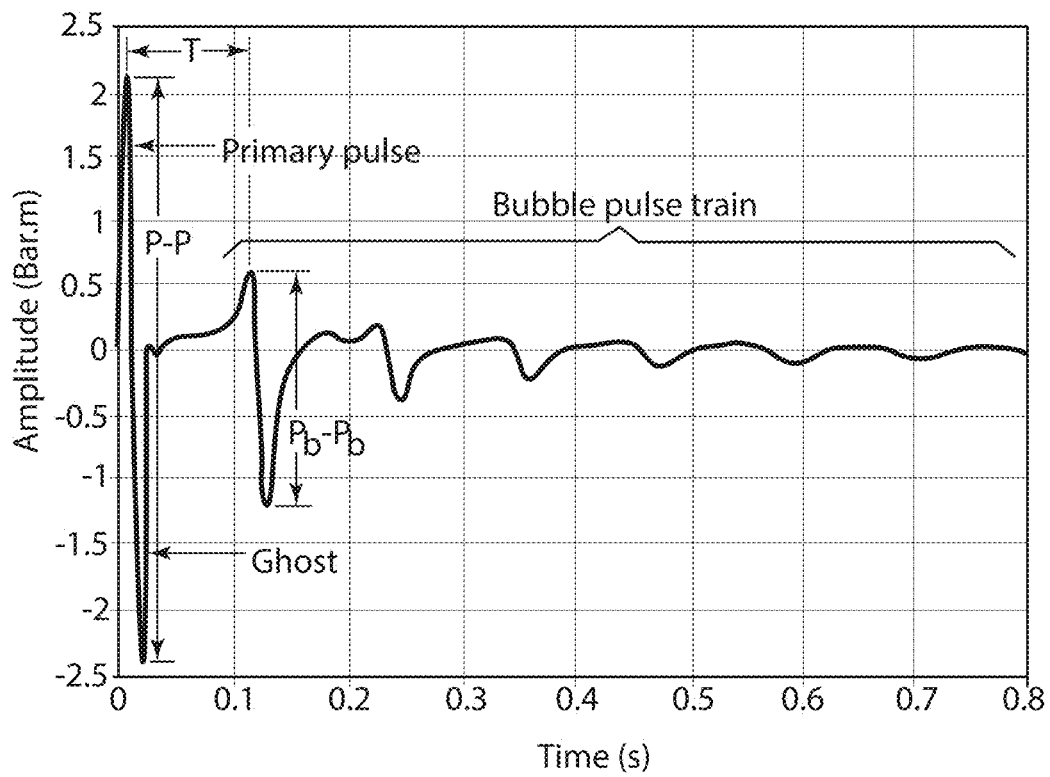
FIG. 2 is a graph illustrating the amplitude of a source array function of time.
Figure 3:
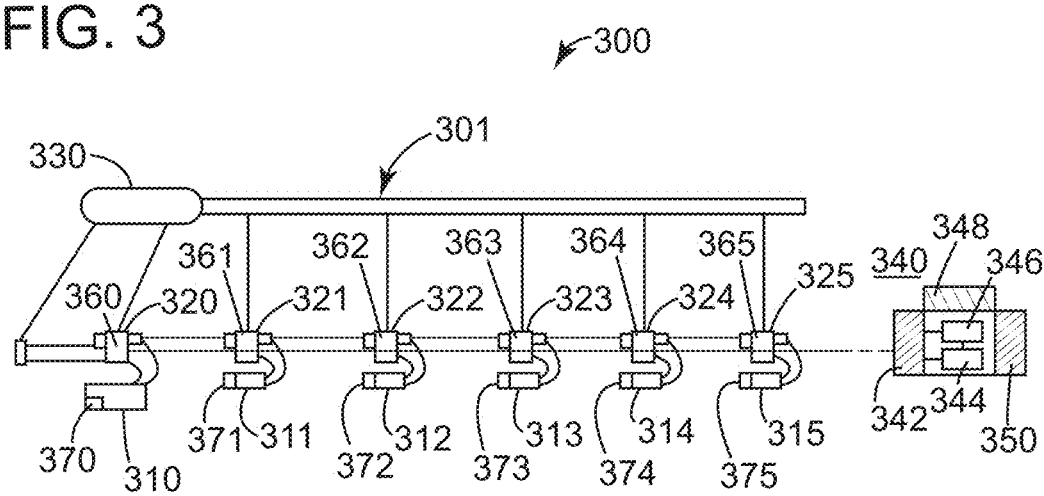
FIG. 3 illustrates a sub-array having near-field hydrophones.

Before discussing the details of this method, the NFH sensors and the source array to which the sensors are attached are illustrated in FIG. 3. This figure illustrates a single sub-array 301 of a marine source array 300. Sub-array 301 (the source array may include any number of sub-arrays) includes air guns (guns herein) 310, 311, 312, 313, 314, and 315 and corresponding near-field sensors 320, 321, 322, 323, 324, and 325, which may be located near (e.g., above) the individual sources 310-315, respectively. Near-field sensors 320-325 may be hydrophones or geophones or other suitable sensors. The number and arrangement of the individual sources are merely exemplary and are not intended to be limiting. Each of the guns 310-315 may be a single air gun or a cluster of air guns. Near-field sensors 320-325 may be located at about 0.5 to 1 m above the corresponding air guns 310-315. The distance in-between neighboring air guns may be about 3 m. The marine source sub-array 301 may include a float 330 for supporting the guns to a desired depth.

Near-field sensors 320-325 are connected to a seismic data processing unit 340 (e.g., located on the towing vessel), including an interface 342, a processor 344 and a memory 346. The seismic data processing unit 340 may also include a monitoring unit 348 and a display 350. In one application, processing unit 340 is the gun controller. In another application, each gun has its own gun controller 360-365, mounted next to the gun. The gun controllers 360-365, if installed next to their corresponding guns, may be configured to communicate via interface 342 with the seismic data processing unit 340, e.g., for receiving instructions from the processing unit 340 and/or for providing information to the processing unit. Each air gun may include an internal sensor called time break (TB) that provides an approximate time of when the air gun is fired. For illustration purposes, TB sensors 370 to 375 are shown in FIG. 3 being located inside corresponding guns.

Figure 4:
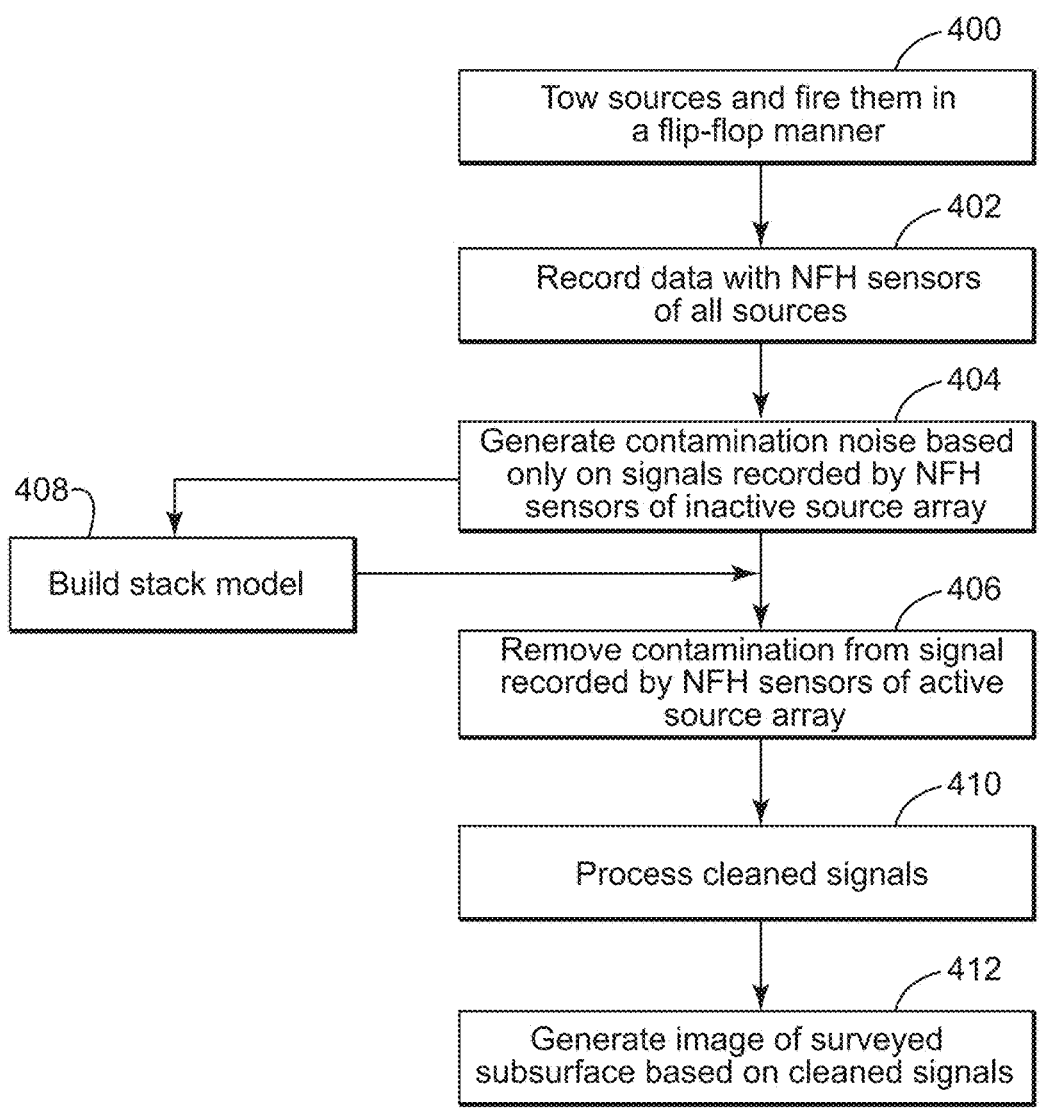
FIG. 4 is a flowchart of a method for removing water bottom and geological contamination from recordings of a set of NFH sensors.
Figure 5:
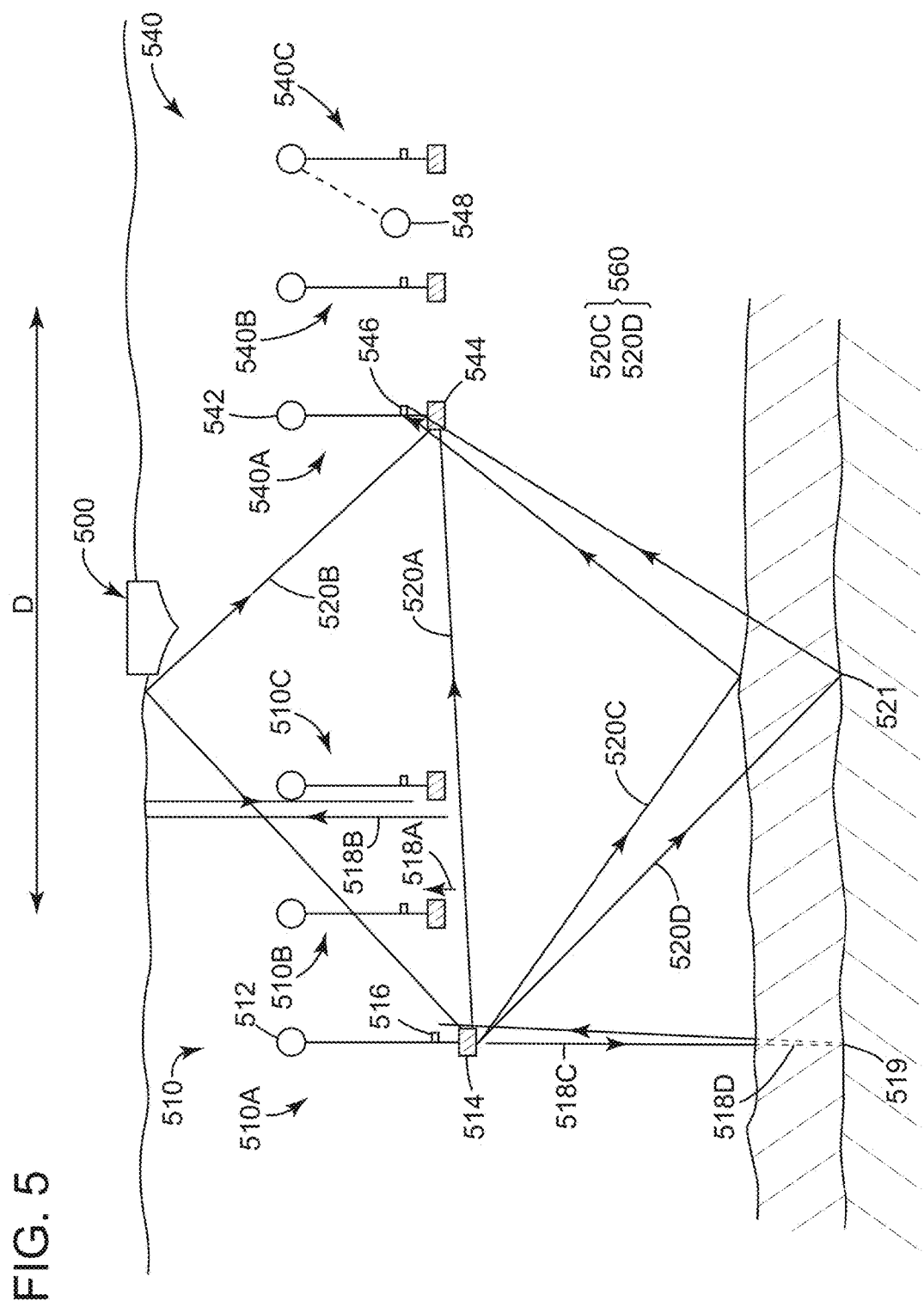
FIG. 5 illustrates a configuration of source arrays and corresponding NFH sensors.

The method for removing water bottom and/or geology contamination is now discussed with regard to FIG. 4 and the configuration used in this method is illustrated in FIG. 5. In most marine seismic surveys, two source arrays 510 and 540 (referred to as the port and starboard source array here) are towed by the survey vessel 500. Source arrays 510 and 540 are shown in FIG. 5 in cross-section, each including three sub-arrays 510A-C and 540A-C, respectively. Each sub-array is similar to the sub-array illustrated in FIG. 3, i.e., it includes a float 512 or 542 and plural air guns 514 or 544 suspended from the float. The air guns can be suspended at the same or different depths. The air guns can be the same or different types or volumes. These source arrays are fired alternately in step 400, in a fashion referred to as flip-flop (i.e., the port source array 510 fires at a first instant while starboard source array 540 is quiet; the starboard source array 540 is fired at a next second instant while the port source array 510 is quiet; and this pattern of a source array being active while the other source array is inactive is repeated during the duration of the seismic survey).

There are NFH sensors 516 or 546 mounted on each source array in the vicinity of the guns as previously discussed with regard to FIG. 3. FIG. 5 shows NFH sensors 516 (only one is shown for simplicity) for source array 510 and NFH sensors 546 (only one is shown for simplicity) for source array 540. In one embodiment, NFH sensors 546 are mounted on a short streamer 548 directly attached to source array 540. In other words, the method described herein works when one set of NFH sensors is installed on one source array and a second set of NFH sensors is not installed on the same source array, but rather on another source array or any other carrier that is not too far away from the first source array. Each sub-array may have its own short streamer 548 or they may share one or more such streamers. A short streamer may have a length of about 50 to 300 m and may include hydrophones and/or other sensors.

According to step 402 of the method, recordings are taken from all the NFH sensors 516 and 546 on each source array, even though only one source array is firing at a time. This means that during this step, supposing that source array 510 is fired, NFH sensors 516 associated with the fired source array 510 and NFH sensors 546 associated with the inactive (quiet) source array 540 record seismic data (i.e., primaries, ghosts, water bottom reflected signals and shallow geology signals). FIG. 5 illustrates primaries 518A, ghosts 518B, ocean bottom signals 518C and shallow subsurface layer related signals 518D generated due to source array 510 and being recorded by NFH sensors 516. NFH sensors 546 record primaries 520A, ghosts 520B, ocean bottom signals 520C and shallow subsurface layer related signals 520D due to the firing of source array 510. Note that the air guns in the source array may fire at substantially the same time, incorporate delays as a function of air gun depth (for example as described in Siliqi, R., Payen, T., Sablon, R. and Desrues, K., 2013, "Synchronized multi-level source, a robust broadband marine solution," 83*rd Annual International Meeting, SEG*, Expanded Abstracts) and may operate with synchronous or with asynchronous timing (for example as described in U.S. Pat. No. 8,837,255).

Figure 6:
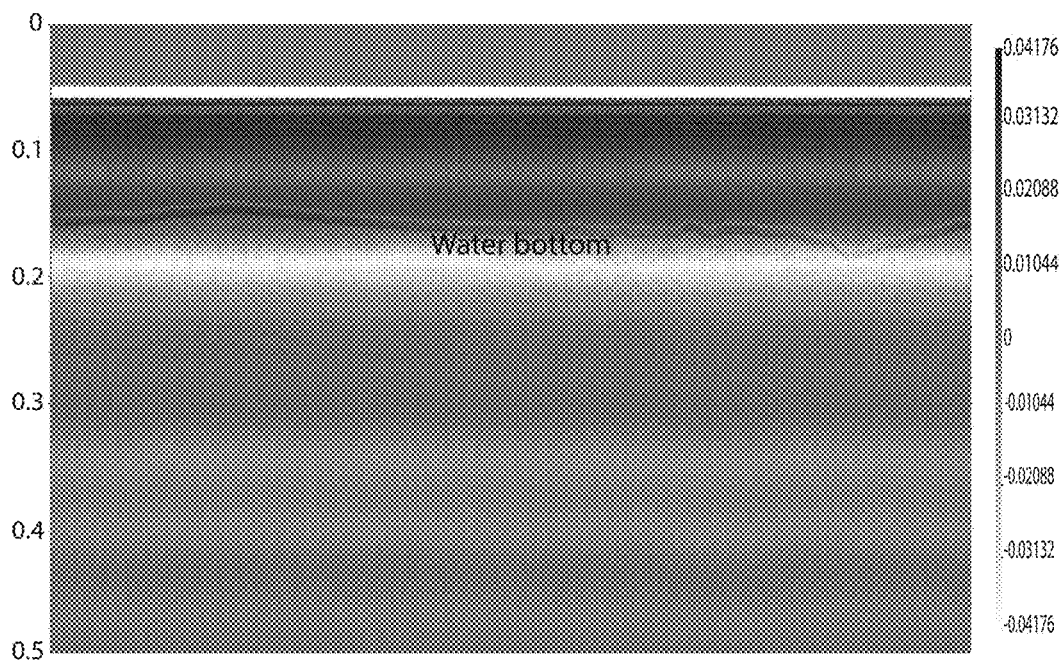
FIG. 6 illustrates shot by shot recordings of NFH sensors corresponding to an active source array.
Figure 7:
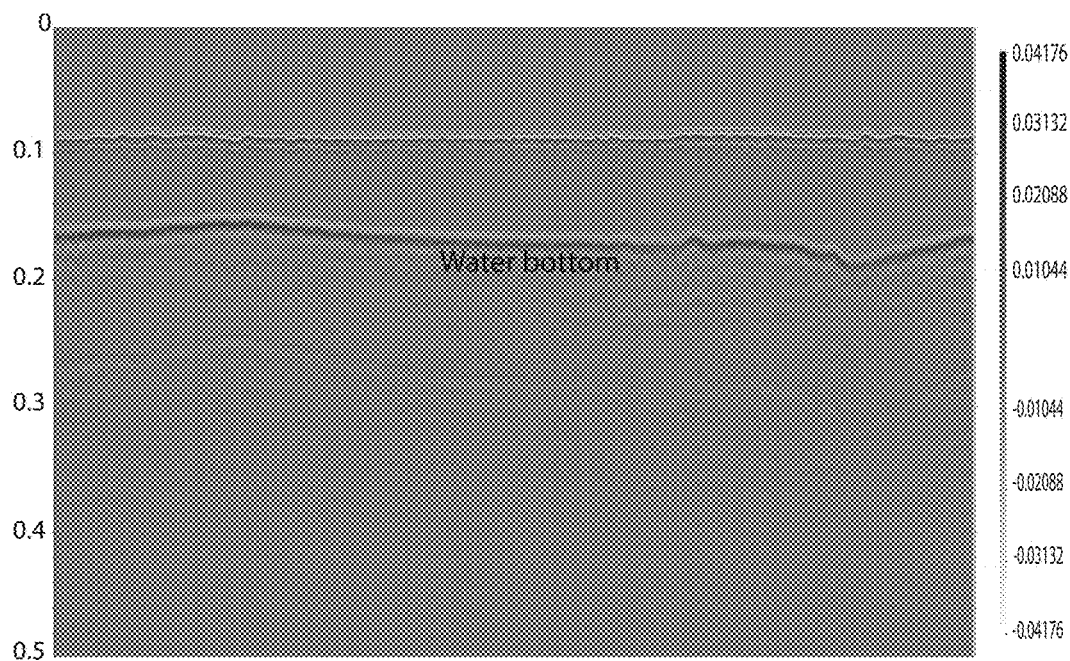
FIG. 7 illustrates shot by shot recording of NFH sensors corresponding to an inactive source array.

In the calculation of the notional sources by Ziolkowski's method discussed above, only the recordings (see FIG. 6) from the NFHs 516 mounted on the fired source array 510 are used while the recordings (see FIG. 7) from the NFHs 546 mounted on the inactive source array 540 (for which the airguns were inactive for that shot) are generally discarded. The NFH sensors 546 are not in the near-field of the guns 514 being fired, but the source arrays 510 and 540 are sufficiently close together (generally the distance D apart is about 50 m, half the streamer cable spacing for the survey; however, it is possible that distance D is 200 m or less) so as not to be in the far-field. The NFH sensors 546 on the inactive source array 540 for a particular shot will contain primary 520A and ghost 520B reflected data from the firing guns 514 of the active source array 510, but also signals 520C and 520D reflected from the water bottom and geology, respectively. Signals 520A-520D, which are discarded by the traditional methods, are generally similar to the signals 518A-518D recorded by the NFHs 516 on the active source array 510, and thus, they contain valuable information. In this respect, note that FIG. 5 is not at scale and for this reason signals 518A-D and 520A-D appear to be different. In practice, sampled points 519 and 521 are almost identical, as the depth of these points is between 1000 and 3000 m while the distance D is about 50 m.

In step 404, the water bottom and geology related signals 520C and 520D recorded by the NFH sensors 546 on the inactive source array 540 are used to construct an estimate model 560 of the contamination noise. Note that it is desirable to avoid interference to the water bottom and geology related signals recorded by the hydrophones on the inactive source array, as a result of the firing of the guns on that source array. Therefore, the guns on the inactive source array should not fire until a sufficient recording length has been achieved for the source signature recordings. This will be typically at least one to two seconds, depending on the required source signal representation length needed for adequate designature. This may depend, for example, on the duration of time the bubble energy will take to dissipate to negligible levels. It is well known that the bubble dissipation time will be longer for large airguns than for small airguns, as such this time will be source dependant. This sufficient recording length for the inactive source array is called herein a predefined time interval, which those skilled in the art would understand that changes from seismic survey to seismic survey.

Step 404 may be implemented as follows. Because the NFH sensors 546 on the inactive source array 540 contain primaries and ghost signals 520A and 520B from the active source array 510, as well as the water bottom and geology signals 520C and 520D, it is desired to remove signals 520A and 520B in the NFH sensors recordings that do not correspond to the contamination model 560. This may be achieved, for example, by taking a window around the water bottom and geological contamination and blanking off the data (signals) outside of this window (note that the approximate location of the water bottom may be known from other sources, and thus, the window may be centred on the depth of the ocean bottom for removing the primaries and ghosts). This sub-step may be performed early in the processing of the NFH sensors data, but could also be performed later in the processing sequence if further corrections need to be applied to the NFH sensors data due to time shift and amplitude corrections, which will be described later. Those skilled in the art would know that other methods and/or algorithms may be used for separating signals 520A and 520B from signals 520C and 520D.

In step 406, the contamination model 560 is used to remove the contamination from signals 518A-D recorded by the NFH sensors 516 of the active source array 510. One way to implement this step of removing the contamination is to subtract the contamination model 560 from the corresponding signals 518A-D recorded by the NFH sensors 516 on the active source array 510, for example, on a shot by shot basis. In this way, "cleaned" signals are obtained. The subtraction may either be a direct subtraction, or an adaptive subtraction. The adaptive subtraction may use (generate) a filter to achieve improved subtraction of the contamination. The filter may be in one or more dimension, may be applied in a model domain (e.g., tau-p domain) and may be derived using sparseness weights.

This step assumes that both source arrays 510 and 540 have essentially the same symmetrical configuration, as is generally the case. As the source arrays 510 and 540 are usually towed at the same distance behind the vessel 500, the corresponding NFH sensors' signals on each source array will have approximately the same position along the direction of travel (inline direction) of the vessel. The amplitudes of these signals will be very similar to the contamination on the active source due to the source arrays 510 and 540 being positioned relatively close together (e.g., 50 m).

For those cases in which the water bottom and geology are flat and there is insignificant variation in the contamination along a travel line, a stack model may optionally be constructed in step 408, from the signals recorded by the NFH sensors of the inactive source array and this stack model may be subtracted in step 406 from the signals recorded by the NFH sensors on the active source array. The stack model may relate to a stack of near-field hydrophone data along a whole sail-line, more than one sail-line, a running mean window of data, or data selected based on a similarity measure (for example cross-correlation). The stack may also include trimmed mean or median calculations. The stack model could be subtracted from either the shot by shot NFH recordings of the NFH sensors of the active source array or the stacked NFH recordings of the NFH sensors of the active source array, to give shot by shot or stacked NFH recordings as desired. The stack may, at least, partially attenuate direct arrival energy which may contaminate the inactive source NFH data.

In step 410, which is optional, the cleaned signals may be further processed, for example, one or more pre-processing methods may be applied, e.g., demultiple, signature deconvolution, trace summing, vibroseis correlation, resampling, streamer response filtering, far-field signature computation, notional source inversion, etc. The processing of the NFH data may result in the computation of a source signature or notional sources which may be used to compensate for at least one of bubble energy, a free surface ghost, zero phasing, minimum phasing, gun shaping, array correction, source signature matching to another acquisition. The compensation may utilize a designature operator or use an inversion, for example as described in EP Patent 2696217 or WO 2014/177522. The source signature compensation may be applied to other seismic data (e.g. streamer, OBS, land, autonomous node, inactive source NFH data, etc.). Then, the processed other seismic data may enter a main processing stage in which deconvolution, amplitude analysis, statics determination, common middle point gathering, velocity analysis, normal move-out correction, muting, trace equalization, stacking, noise rejection, amplitude equalization, etc. may be applied. Finally, a phase of final or post-processing methods may be applied, which may include, e.g., migration, wavelet processing, inversion, etc.

The cleaned signals or the processed cleaned signals are ultimately used in step 412, in this embodiment, for generating an image of the surveyed subsurface. For example, the cleaned near-field hydrophone signals may be used to estimate a representation of the source array emission (for example notional sources or a far-field signature). The source array emission estimate may then be used to process the seismic data, for example, the streamer, land or OBN data. In one application, the source array emission is used to generate a source compensation filter, which modifies the seismic data to correct, or compensate, for the effect of the source array. The source emission representation is a wavelet or wavelets which represent the behavior of the source array, for example, a set of notional sources or a far-field or set of far-fields as discussed above. These representations may be used to design one or more source compensation filters which, when applied to the seismic data, compensates this data for the effect of the source array. Alternatively, the source emission representation may be used in an inversion to estimate a new seismic dataset with a different source emission (for example as described in EP Patent 2696217). This can include compensating the seismic data for at least one of bubble energy, a free surface ghost, zero phasing, gun shaping, source signal matching to simulate a different source array, and array correction. There are a number of different methods that can be used to generate the filter, which are well known by those skilled in the art. For this reason, these methods are not discussed herein. The step of processing may involve source signal compensation, convolution, inversion, designature, demultiple, velocity estimation, imaging, or other processing.

This image is important for the oil and gas exploring company, as today, a decision for drilling a well and the location of the well relies on this image.

The above discussed method may be refined to take into account the fact that there are likely to be small time shifts Δt between the water bottom and geological contamination between the signals recorded with the NFH sensors of the active source array and the NFH sensors of the inactive source array. In the case of a flat water bottom this is because, for the active source array, the contamination will have almost a zero degree propagation angle (i.e., a vertical arrival as illustrated in FIG. 5). The contamination will not be quite vertical for the inactive source array, although it will be close to the vertical position (as already discussed above, FIG. 5 is not at scale and for this reason it appears as signals 520A-D make a large angle with the vertical when in reality, that angle is extremely small), due to the small separation D between the source arrays. The time shifts Δt may be estimated, for example, from the water bottom depth, the dip of the water bottom, the distance D between the source arrays and trigonometry relations, and the time shifts Δt may be applied to the model contamination 560 prior to the subtraction in step 406.

An alternate method of calculating the time shifts Δt is to cross-correlate the NFH sensors recordings from the inactive source array with the NFH sensors recordings from the active source array. The NFH recordings from the active source array may be filtered prior to the cross-correlation to remove the low frequency bubble energy. Similar to the corrections for time shifts, analogous corrections to the amplitudes of the recordings may be made to take into account the relative distances travelled by a ray at a zero propagation angle corresponding to the position of the NFH sensors of the active source array and a ray at a propagation angle corresponding to the position of the NFH sensors on the inactive source array.

The above embodiments have been discussed with regard to NFH sensors located on two different source arrays. However, the principles of the above noted embodiments equally apply when similar sensors (e.g., hydrophones) are located on one source array and on the vessel, or on one source array and on the head of the streamers, or on one source array and a location close to the source array but not on the source array (e.g., short streamer 548).

In one embodiment, the measurements associated with the NFH sensors of the inactive source array (called herein measurements of the passive hydrophones) can be used for some additional purposes. For example, these measurements may be used, either on their own or in combination with the active hydrophone measurements, as a means of picking the water bottom to be used in seismic processing or for other purposes. As one specific example, the derived water bottom could be used in the derivation of de-multiple operators (e.g. Green's functions) or in other methods of carrying out de-multiple (e.g., surface-related multiple elimination (SRME), radon, etc.) on seismic data.

The signals from the passive hydrophones may be used on their own or in combination with other data such as data from the active hydrophones (e.g., hydrophones near to the firing guns), from seismic streamers or ocean bottom recording devices, or other recording devices such as fish sensors (a hydrophone towed beneath the vessel to measure the far-field) for inversion purposes to find far-fields or notional sources.

Another use of the data from the passive hydrophones, as well as data from the active hydrophones, is to consider them as near-offset data and to combine them or use them in conjunction with streamer data or ocean bottom data in seismic processing. Alternatively, the measurements from the passive hydrophones may be processed independently of the streamer data, for example, to create a high-resolution near-offset volume of data.

Figure 8:
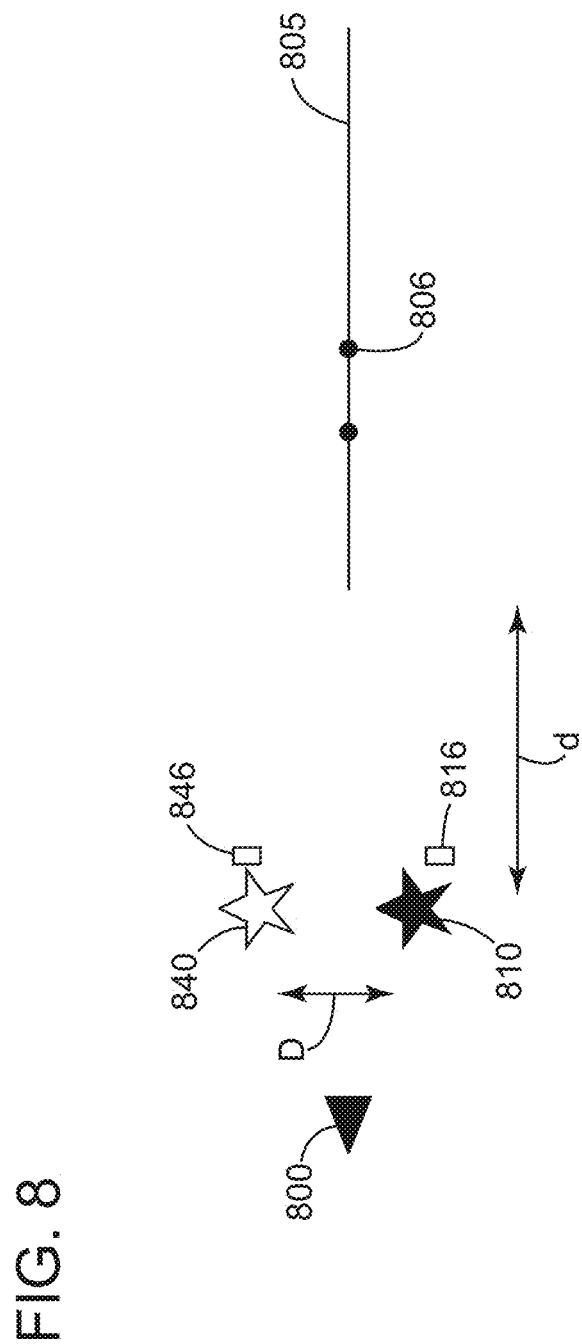
FIG. 8 illustrates a marine seismic acquisition system for collecting seismic data with passive and active sensors.

More specifically, according to an embodiment illustrated in FIG. 8, a marine acquisition system has a vessel 800 that tows two source arrays 810 and 840 with a distance separation D, which can be about 50 m. The vessel also tows streamers 805 (only one is shown for convenience) having seismic sensors 806. The active source array 810 fires and recordings are made by sensors 806 on the streamer 805 as well as by near-field sensors 816 mounted on the active source array 810 and near-field sensors 846 mounted on the inactive source array 840. It should be noted that the sensors may be hydrophones, accelerometers, geophones, or other sensors. A mixture of different sensors may be used, for example, hydrophones may be mounted on the source array, and hydrophones and accelerometers may be mounted on the streamer. In addition, some of the sensors may be configured to form an analogue or digital array. For example, point hydrophones may be mounted on the source arrays and hydrophone arrays may be used on the streamer. There may be other differences between the sensors mounted on the source arrays and those mounted on the streamers. For example, the sampling interval and analogue/digital low/high cut filters may differ. In addition, the sensors on the source arrays may be at a different depth from the sensors on the streamers. As such, the free surface ghost notch may be different for the streamer and source array data. In one application, there may also be different start of data recording delays. The combined effect of the source array, analogue/digital filtering, and sensor depth may be defined at the recording response.

The configuration illustrated in FIG. 8 shows that while the minimum offset d between the streamer and the source array is of the order of 150 m, the minimum offset D of the inactive source array 840 relative to the active source array 810 may be in the order of 50 m. In this case, the sensors on the inactive source array are at shorter offset than the sensors on the streamer. While normally the inactive source sensors will not be used, according to an embodiment, the inactive source array sensor data is combined with the streamer sensor data to form a seismic image.

The streamer data will be contaminated by free surface multiples which may (at least partially) be described by the zero offset Earth response. Pica et al., 2005, in "3D surface-related multiple modelling, principles and results," 75th Ann. Internat. Mtg: Soc. of Expl. Geophys., Expanded Abstracts, 2080-2083, and Wang et al., in "Model-based water-layer demultiple," 81st SEG Annual International Meeting, Expanded Abstracts, 3551-3555, describe methods of using zero-offset reflectivity information to predict free surface multiples. Pica et al. uses a migration of short offset data while Wang et al. use a Green's function representing the zero offset timing of a multiple generator, normally the water-bottom.

Figure 9:
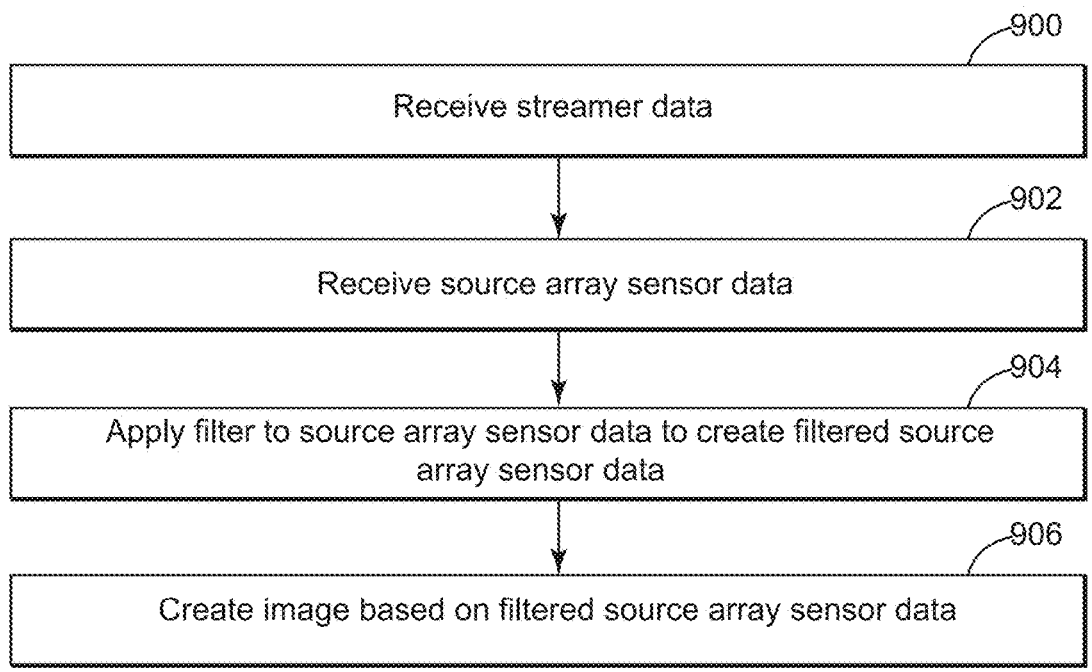
FIG. 9 is a flowchart of a method for generating filtered source array sensor data.

According to this embodiment, there is a method, as illustrated in FIG. 9, in which in step 900 streamer data relating to a first recording response is received. In step 902, source array sensor data relating to a second recording response is received. In step 904, a filter is applied to the source array sensor data to create filtered source array sensor data, and in step 906, an image is created using the filtered source array sensor data. The filter may be a function of the streamer data and the source array sensor data.

In one application, the source array sensor is mounted on the active source array. In another application, the source array source is mounted on the inactive source array. In one application, the source array sensor data and the streamer data are recorded at different sample intervals while in a different application, they are recorded at the same sample interval.

Figure 10:
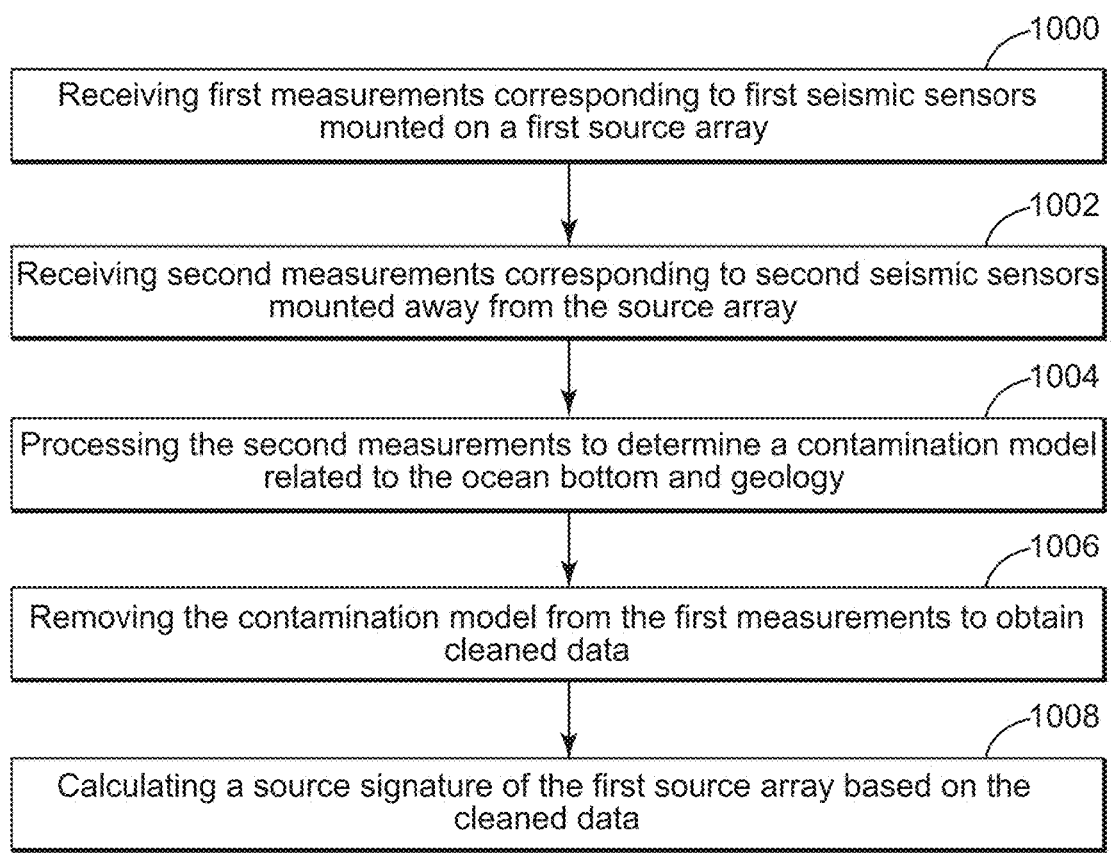
FIG. 10 is a flowchart of a method for calculating a source signature of a source array based on cleaned data.

In still another application, the filtered source array sensor data is used to calculate a convolutional filter to predict multiples for the streamer data. The convolutional filter may be based on a water-bottom picking of the filtered source array sensor data. In yet another application, the convolutional filter is a function of a muted filtered source sensor data. A method for removing ocean bottom and/or geology related contamination is now discussed with regard to FIG. 10. The method includes as step 1000 of receiving first measurements corresponding to first seismic sensors mounted on a first source array; a step 1002 of receiving second measurements corresponding to second seismic sensors mounted away from the first source array; a step 1004 of processing the second measurements to determine a contamination model 560 related to the ocean bottom and geology; a step 1006 of removing the contamination model from the first measurements to obtain cleaned data; and a step 1008 of calculating a source signature of the first source array based on the cleaned data.

In one application, the first seismic sensors are near-field hydrophones and the second seismic sensors are also near-field hydrophones. In another application, the second seismic sensors are located on a second source array, that is towed together with the first source array by a same vessel. A distance D between the first and second source arrays along a direction perpendicular on a travelling direction is 200 m or less. In one application, the method fires the first and second source arrays in a flip-flop manner while being towed by the vessel. In another application, the second seismic sensors are located on streamers towed by a vessel that also tows the first source array or the second seismic sensors are located on a short streamer attached to the first source array. A distance between a water surface and the ocean bottom is 2,000 m or less.

The step of processing may include windowing the second measurements around the ocean bottom and the geology for generating the contamination model. The step of removing may include subtracting the contamination model from the first measurements. The method may also include a step of calculating an image of a surveyed surface by processing the seismic data with the assistance of a source compensation filter, using a representation of the source emission derived from the cleaned near-field hydrophone data. The contamination model may include only water bottom and geology related reflections. In one application, the method includes a step of stacking the second measurements for calculating the contamination model.

Figure 11:
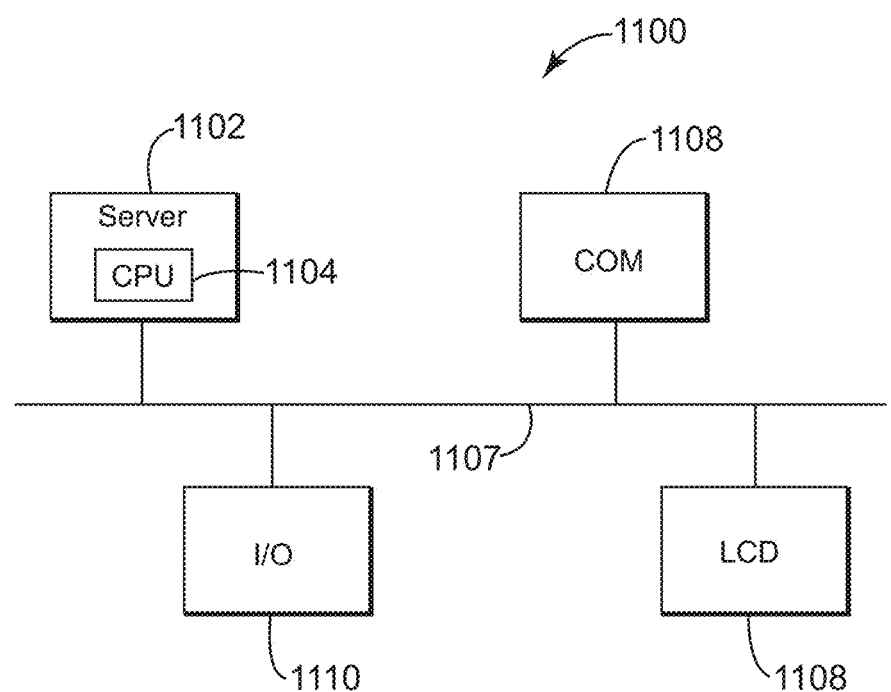
FIG. 11 is a schematic representation of an embodiment of a computing system for use in executing a method as described herein.

Referring now to FIG. 11, exemplary embodiments are directed to a computing system 1100 for estimating a contamination model 560 for two source arrays that are fired in a flip-flop manner. Note that the above embodiments may be applied to more than two source arrays and the source arrays may also be fired in another mode than the flip-flop mode. In one application, the source arrays are towed by more than one vessel. In one embodiment, a computing device for performing the calculations as set forth in the above-described embodiments may be any type of computing device capable of obtaining, processing and communicating acquired seismic data from marine surveys. The computing system 1100 includes a computer or server 1102 having one or more central processing units 1104 in communication, through a bus 1107, with a communication module 1106, one or more input/output devices 1110 and at least one storage device 1108.

The communication module is used to obtain recordings from two sets of sensors (e.g., 516 and 546), one located on a source array and the other one located away from the source array, e.g., on another source array. These recordings can be obtained, for example, through the input/output devices. The acquired recordings are stored in the storage device. The input/output device can also be used to communicate or display the cleaned signals, the source emission representations, and any images or models generated for the subsurface or seismic survey, for example, to a user of the computing system.

The processor is in communication with the communication module and storage device and is configured to calculate the contamination model from the recordings corresponding to the passive sensors and then to remove the contamination model from the recordings of the active sensors to obtain the cleaned signals. In one embodiment, the processor is configured to generate an image of the surveyed subsurface with the aid of source compensation based on the source emission representation derived from the cleaned signals.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 1112. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 1100 can be used to implement the methods described above associated with estimating a contamination model and/or calculating a far-field signature for a source array. Hardware, firmware, software or a combination thereof may be used to perform the various steps and operations described herein.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for estimating a far-field signature for a source array in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed exemplary embodiments provide a computing device, software and method for removing a contamination model from recordings performed with NFH sensors. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for marine seismic exploration improving subsurface imaging by removing ocean bottom and/or geology related contamination from measurements used to calculate source signature, the method comprising:
receiving first measurements acquired, while a first source array is fired, by first seismic sensors mounted on the first source array;
receiving second measurements acquired by second seismic sensors mounted away from the first source array;
processing the second measurements to determine a contamination model related to the ocean bottom and geology;
removing the contamination model from the first measurements to obtain cleaned data;
calculating a source signature of the first source array based on the cleaned data; and
generating an image of surveyed subsurface by extracting information thereof using the source signature, from seismic data recorded with streamers, ocean bottom cables or ocean bottom nodes, after the first source array was fired.

2. The method of claim 1, wherein the first seismic sensors are near-field hydrophones and the second seismic sensors are also near-field hydrophones.

3. The method of claim 1, wherein the second seismic sensors are located on a second source array.

4. The method of claim 3, wherein the second source array is towed by another vessel than the first source array.

5. The method of claim 3, wherein the second source array is towed by the same vessel as the first source array.

6. The method of claim 3, wherein a distance D between the first and second source arrays is 200 m or less.

7. The method of claim 3, wherein the second source array is not fired within a predefined time interval after the firing of the first source array.

8. The method of claim 1, wherein the second seismic sensors are located on streamers towed by a vessel that also tows the first source array.

9. The method of claim 1, wherein the second seismic sensors are located on a short streamer attached to the first source array.

10. The method of claim 1, wherein a distance between a water surface and the ocean bottom is 2,000 m or less.

11. The method of claim 1, wherein the step of processing comprises:
windowing the second measurements around the ocean bottom and the geology for generating the contamination model.

12. The method of claim 1, wherein the step of removing comprises subtracting the contamination model from the first measurements.

13. The method of claim 1, further comprising:
receiving third measurements acquired, while a second source array is fired, by the second seismic sensors mounted on the second source array;
receiving fourth measurements acquired by the first seismic sensors;
processing the fourth measurements to determine another contamination model related to the ocean bottom and geology;
removing the other contamination model from the third measurements to obtain second cleaned data;
calculating another source signature of the second source array based on the second cleaned data; and
generating another image of the surveyed subsurface by extracting information thereof using the other source signature, from other seismic data recorded with the streamers, ocean bottom cables or ocean bottom nodes, after the second source array was fired.

14. The method of claim 1, further comprising:
calculating a source emission representation based on the cleaned data;
determining a source compensation filter based on the source emission representation; and
applying the source compensation filter to the seismic data.

15. The method of claim 1, wherein the contamination model includes only water bottom and geology related reflections.

16. The method of claim 1, further comprising:
stacking the second measurements for calculating the contamination model.

17. A computing device for marine seismic exploration improving subsurface imaging by removing ocean bottom and/or geology related contamination from—measurements used to calculate source signature, the computing device comprising:
an interface for receiving first measurements acquired, while a first source array is fired, by first seismic sensors mounted on the first source array, and for receiving second measurements acquired by second seismic sensors mounted away from the first source array; and
a processor connected to the interface and configured to,
process the second measurements to determine a contamination model related to the ocean bottom and geology;
remove the contamination model from the first measurements to obtain cleaned data;
calculate a source signature of the first source array based on the cleaned data; and
generate an image of surveyed subsurface by extracting information thereof using the source signature, from seismic data recorded with streamers, ocean bottom cables or ocean bottom nodes, after the first source array was fired.

18. The computing device of claim 17, wherein the first seismic sensors are near-field hydrophones and the second seismic sensors are also near-field hydrophones and the second seismic sensors are located on a second source array.

19. The computing device of claim 18, wherein the second source array is towed by another vessel than the first source array.

20. A non-transitory computer readable medium including computer executable instructions, wherein the instructions, when executed by a computer, implement a method for marine seismic exploration improving subsurface imaging by removing ocean bottom and/or geology related contamination from measurements used to calculate source signature, the method comprising:
receiving first measurements acquired, while a first source array is fired, by first seismic sensors mounted on the first source array;
receiving second measurements acquired by second seismic sensors mounted away from the first source array;
processing the second measurements to determine a contamination model related to the ocean bottom and geology;
removing the contamination model from the first measurements to obtain cleaned data;
calculating a source signature of the first source array based on the cleaned data; and
generating an image of surveyed subsurface by extracting information thereof using the source signature, from seismic data recorded with streamers, ocean bottom cables or ocean bottom nodes, after the first source array was fired.

* * * * *